Jan. 10, 1939.   E. M. FRANKEL ET AL   2,143,345
PURIFICATION OF TALL OIL
Filed April 11, 1935   3 Sheets-Sheet 1

INVENTORS.
EDWARD M. FRANKEL
ARTHUR POLLAK
BY
ATTORNEY.

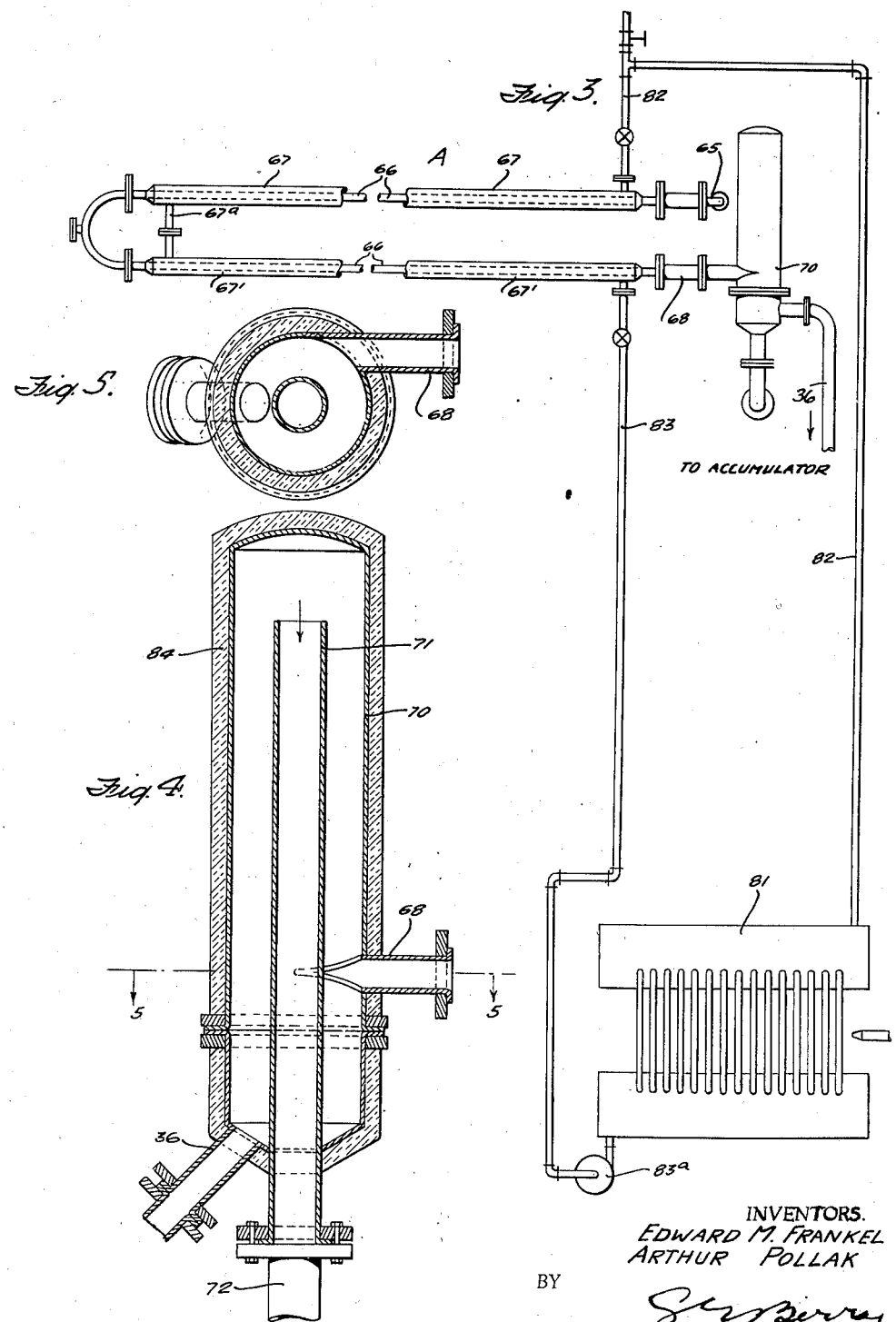

Patented Jan. 10, 1939

2,143,345

UNITED STATES PATENT OFFICE 2,143,345

PURIFICATION OF TALL OIL

Edward M. Frankel and Arthur Pollak, New York, N. Y., assignors to West Virginia Pulp & Paper Company, New York, N. Y., a corporation of Delaware Application April 11, 1935, Serial No. 15,743

6 Claims. (Cl. 202—53)

Our present invention relates to processes for purifying the rosin and fatty acids occurring in the waste liquors resulting from the cooking of coniferous woods and to novel products produced by our improved process.

It has been known for many years that certain woods, especially those generically designated as pine, contain fatty acids in various combinations along with rosin acids. Ordinarily, the combined rosin and fatty acid content of the pine woods used in paper making will run somewhat in excess of 3% of the dry wood of which the fatty acids form about 20% or more of the product. In the manufacture of wood pulp by the soda process, these rosin and fatty acids remain in the treating liquor as soaps. It is customary, however, to concentrate the waste soda liquor, or so-called black liquor, for the recovery of the soda and by-products, and ordinarily these soaps precipitate out during the evaporation forming a sticky mass in the evaporator and necessitating cleaning of the apparatus from time to time. It has been proposed to separate the soaps from the liquor during the evaporation either by centrifuging as in the patent to Drewson No. 1,778,523 or by removing the concentrated liquor from the evaporator and allowing the same to stand until the soap is precipitated, after which the soap-free liquor is returned for further evaporation. The soaps so recovered or the mixture consisting chiefly of rosin and fatty acids obtained by acidification of these soaps, frequently designated tall oil, are, however, dark in color and possess an unpleasant odor and without further purification are commercially valueless.

It is, therefore, a principal object of our invention to purify the soaps so produced to yield a purified resin and a product rich in fatty acids and of a purity adapting it for soap-making and many other uses. Other and more specific objects of the invention will be pointed out as the description proceeds and the features of novelty will be pointed out in the claims.

Briefly stated, our improved process involves preliminary treatment of the crude soaps to yield a rosin and fatty acid mixture suitable for distillation, distillation of such mixture yielding a purified product, crystallization of a substanital proportion of the rosin acids from such purified mixture and, if desired, a redistillation of the liquid component rich in fatty acids.

The distillation of the rosin and fatty acid mixture so derived from pine wood, herein referred to as tall oil, presents special difficulties. Even under high vacua, e. g. around 10 mm. pressure of mercury absolute, the temperature required for distillation is high, say between 400 and 600 degrees F., at which temperatures the tall oil tends to undergo decomposition. We have accordingly devised an improved method and apparatus for distillation which is adapted not only for distillation of tall oil but various difficultly distillable liquids, which process is broadly claimed in our copending application Serial No. 15,742, filed April 11, 1935. One characteristic of our improved distillation process referred to is that we are able to dispense with the use of a gaseous or vapor carrier which has heretofore been used for the purpose of raising the total pressures on the material undergoing distillation. The use of such a carrier is attended with substantial drawbacks, first because at the low pressures involved the volume of the carrier is very great, thereby cutting down the capacity of the still, and secondly, if the carrier used be steam it must be carefully separated from the distillate, or if a gaseous carrier be used it must be chosen so as not to have a chemical action upon the materials undergoing distillation. In the distillation of organic acids of this type, this ordinarily precludes the use of air. As set forth in our copending application referred to, we have found the presence of moisture to be a substantial drawback to the distillation process and accordingly our present invention includes improved steps for obtaining an anhydrous acid mixture. Our invention further contemplates an improved method of treating the soaps to separate therefrom lignin and other impurities present in the waste liquor.

Our invention is also predicated in part upon our observation that by subjecting the crude tall oil to a single distillation a product is obtained which is capable of being crystallized, the impurities originally present in the material inhibiting crystallization. The crystals so obtained consist of rosin acids of high purity, collectively termed "abietic acid", which are adapted for many purposes. The liquid component which preferably is redistilled consists of a mixture rich in fatty acids and is adapted for many industrial uses. The residue from either distillation is referred to herein as "pitch".

As explained in our copending application mentioned, in carrying out the distillation steps we pass the material to be distilled through a heating zone of substantial length which is uniformly heated by the vapor of a high boiling point substance, as for example diphenyl, the conditions of temperature and vacuum being such as to cause the liquid to fractionally vaporize and to have sufficient velocity through the still not only to carry through the unvaporized particles but to enable such particles to be physically separated from the vapor as by the use of a centrifugal separator. Such liquid particles constitute the pitch component and form a valuable by-product.

Our invention will be best understood by reference to the following detailed description taken with the annexed drawings in which Figure 1 shows, more or less diagrammatically, apparatus by which the various steps in the method of purification are carried out;

Figure 3 is an elevational view of the still employed as seen from the left of Figure 2;

Figure 4 is a view in vertical section of the centrifugal separator; and

Figure 5 is a view taken on section 5—5 of Figure 4.

*Preliminary treatment*

Figure 1:
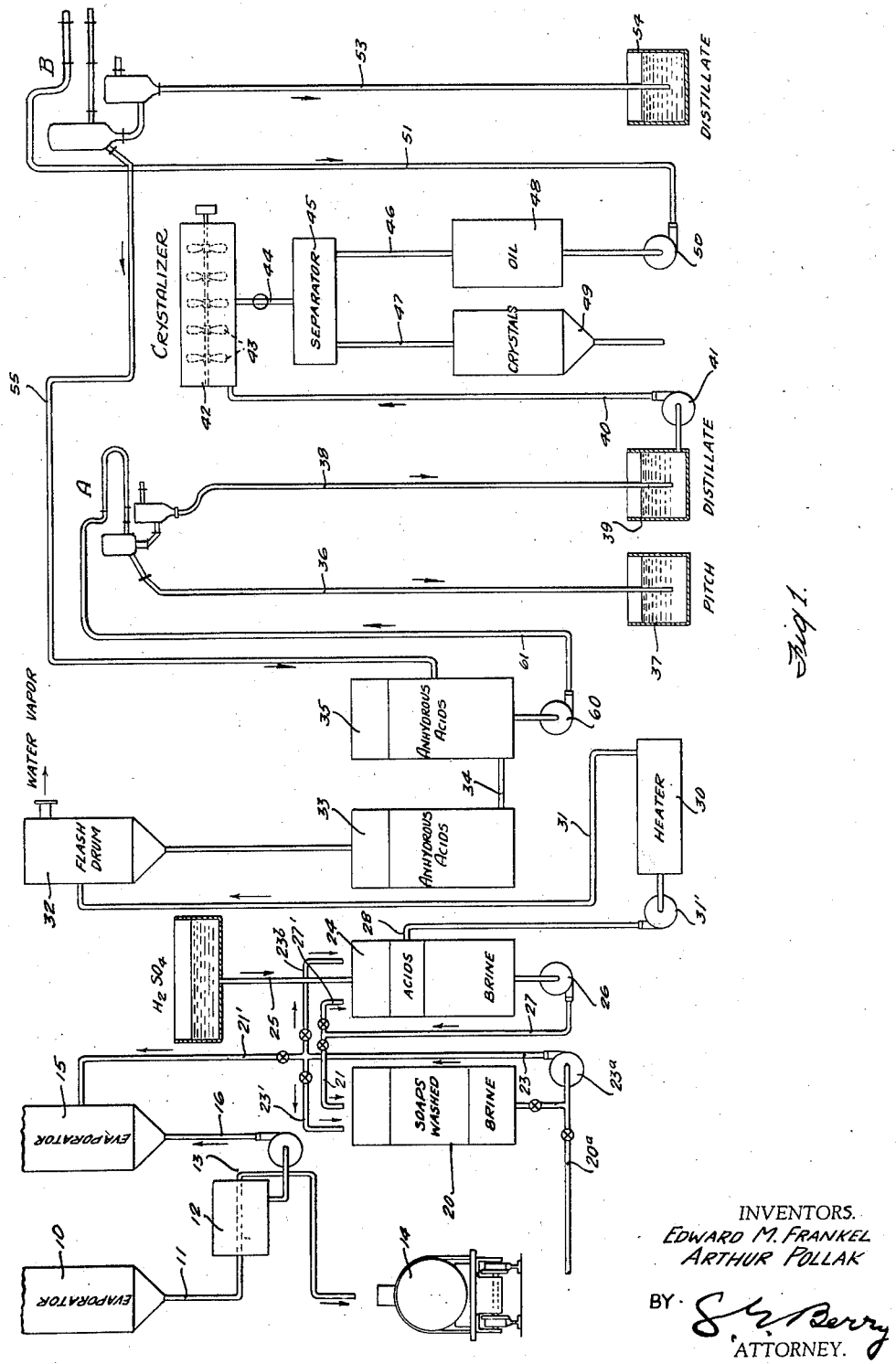
Figure 2:
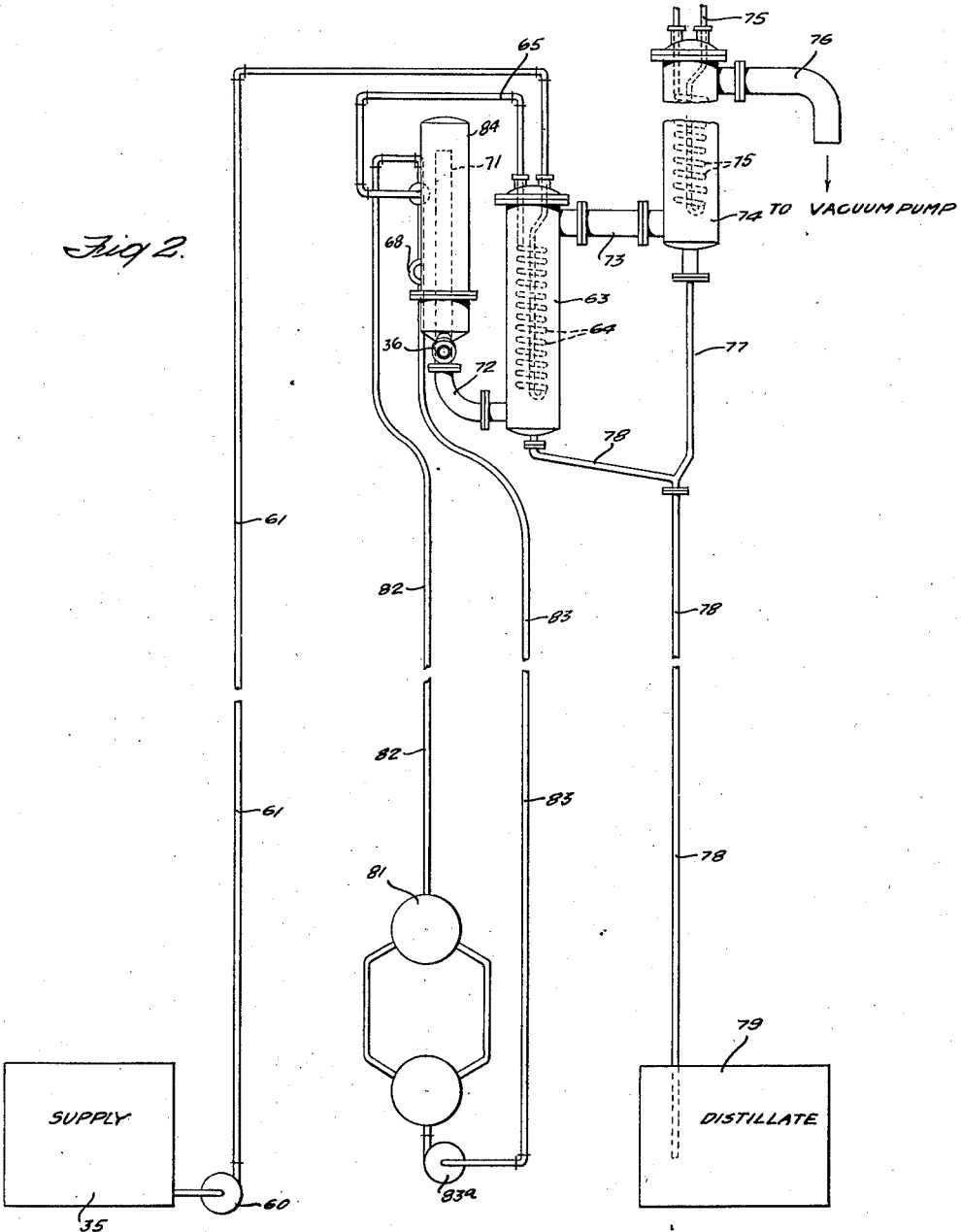
Figure 2 shows in elevation an illustrative embodiment of our improved distilling apparatus.

Referring to Figure 1, so-called black liquor, i. e. obtained from the soda processes of paper pulp manufacture, from evaporator effect 10 is continuously conducted through pipe 11 to tank or vat 12 wherein opportunity is had for the soap to rise to the top; the soapy layer is then continuously removed through pipe 13 into preferably a tank car 14, whereupon the soap-free liquor is pumped back into the next evaporator effect 15 through pipe 16.

From the tank car 14, the crude soaps having, say, an approximate 50% water content are transferred to receiving tank 20 (by means not shown) wherein they are washed or agitated with a solution of sodium sulphate formed in a subsequent step of the process and added through the pipe 21 and in which solution the soaps are substantially insoluble. The washing is accomplished by the means shown including pump 23a, pipes 23 and 23'. It is important to remove as much of the occluded waste liquor as possible as otherwise the lignin content therein is precipitated in the subsequent acidification step forming a bulky precipitate which causes a substantial loss of sulphuric acid and of the organic acids which are contained in the precipitate. The cleaned soaps, after removal of the sodium sulphate brine through pipe 20a, are now pumped through pipes 23 and 23b to a precipitating tank 24 wherein sufficient acidity is maintained by the addition of any suitable acid, as for example 66 Bé. sulphuric acid, through pipe 25 to precipitate the fatty acids, the temperature being kept preferably at the boiling point by the injection of steam from a source not shown. Circulation is maintained by means of a lead pump 26 and pipes 27 and 27' until tests show that the acids are fully precipitated. While the acid value may be varied considerably, we have found a pH of 4.8 to 5.5 to give a satisfactory precipitation, regard being had for the factor of corrosion of the equipment and also that small amounts of soaps left undecomposed tend to clog the equipment used subsequently. Precipitation having been completed and the acids formed into an oily layer, they are drawn off through pipe 28 (which may be provided with a suitable skimming attachment not shown) whereupon the sodium sulphate solution is set back to tank 20 through pipes 27 and 21. From tank 20 some of said solution is sent to the next evaporator effect, 15, by means of pipes 23 and 21'.

The crude fatty acids withdrawn through pipe 28 are now passed through a pipe heater 30, pipe 31 to flash drum 32, the acids being placed under sufficient pressure by means of pump 31' so as to prevent volatilization of the moisture from taking place until the flash drum 32 is reached in order to prevent the tubes and heater 30 from scaling up. Since the boiling point of the oil is much higher than that of water, it is comparatively easy to add enough heat to the mixture so as to substantially completely vaporize the moisture upon release of the pressure in the drum 32, it being desirable to reduce the moisture to less than 0.1 of 1%. Thus, for oil containing 3% moisture the mixture may be heated to 330 degrees F. under which conditions the spray tank will deliver, after flashing, oil at a temperature of around 270 degrees F. Since the tank is at atmospheric pressure, no moisture recondenses at this temperature and the oil is substantially moisture-free. It is now ready for distillation.

The oil from receiver 33 is transferred to a second receiver 35 through pipe 34 from which the oil is pumped continuously in a comparatively small stream to vacuum still-condenser unit A of special construction to be more fully described hereinafter. Still A delivers the unvaporized residue or pitch through the barometric leg 36 into receptacle 37 and a purified product (from the condenser not shown in Figure 1) through barometric leg 38 into receptacle 39. From receptacle 39, the oil is pumped through pipe 40 by means of pump 41 to a crystallizing vessel 42 equipped preferably with a stirring device 43, in which receptacle crystallization takes place. The mixture is then withdrawn through pipe 44 into a centrifugal separator 45, thus yielding an oil component through pipe 46 and a crystal slurry through pipe 47, the respective products being caught in the oil receptacle 48 and the crystal receptacle 49. From the receptacle 48 the oil is preferably pumped through pump 50 to pipe 51 into vacuum still condenser B, similar in construction and operation to unit A, from which a purified distillate is obtained through pipe 53 and collected in receptacle 54, the condenser for this still also not being shown in this figure. The unvaporized product from still B is preferably passed through pipe 55 back into the receptacle 35 where it is added to the crude anhydrous acids.

A description of the stills A and B and their operation now follows:

The crude dried acids are pumped from the source 35 through pump 60 and pipe 61 through the preheater-condenser 63 (passing through the coil 64 therein) and leaving same through pipe 65 in a preheated state whereupon the oil is introduced into the tube still A, Figure 3, passing through the interior pipe 66 which preferably is of U shape and having the horizontal portions thereof enclosed in jackets 67, 67' which are connected by pipe 67a and through which jackets a heating medium is circulated as will be described. The acids which are converted into a fog-like mixture of vapor and liquid particles pass through connection 68 to the lower end of the centrifugal separator 70, shown best in Figure 4. The mixture rises in the annular space between the exterior wall and the interior cylinder 71, the liquid particles being thrown against the interior wall of the separator 70 and leave same by pipe 36 whereas the vapor particles pass downward through the cylinder 71, leaving same through pipe 72 through which they are conducted to the preheater-condenser 63 where part of the vapors are condensed, the remainder leaving through pipe 73 to secondary condenser 74 equipped with cooling coil 75, the system being maintained under high vacuum, e. g. 25 to 2.5 mm. or less, by means of a vacuum pump, not shown, with which pipe 76, leading from the vapor space of condenser 74, communicates. The condensate from condenser 74 leaves through pipe 77 which joins pipe 78 from the condenser 63, which latter leads to the accumulator 79.

It will be noted that the stills and condensers are preferably elevated above the accumulator 79 a sufficient distance to constitute the pipe 78 and branch 77 a barometric leg, thus permitting a continuous withdrawal of the distillate from the system without the aid of a pump.

The liquid particles which are thrown against the interior wall of separator 70 pass downwardly along said wall and leave the separator through the pipe 36 as previously described. To the jackets 67, 67' is fed a supply of heating vapor, as for example that of diphenyl or other substance, from boiler 81 through pipe 82, the condensate from the jackets being returned to the boiler through pipe 83 and pump 83a, suitable valves being provided in said pipes as shown. Various of the pipes including those conducting the heating vapor are preferably provided with lagging, not shown, while the separator 70 is lagged as shown at 84.

The choice of the heating vapor is governed first of all by the temperature at which it condenses under atmospheric pressures or those moderately higher than atmospheric and which accordingly do not involve costly apparatus in their handling. In addition to diphenyl which has been used successfully, diphenyl oxide may also be used as well as naphthalene, various oils, etc. Furthermore, while preferably the heating agent is applied in vapor form so as to take advantage of the heat of condensation, this is not absolutely necessary and the heating agent may be used in the liquid form throughout, if desired.

In operating the system, the velocity of the products through the still should be such as to afford a correct time for heating and to sweep along the unvaporized particles and to provide sufficient velocity in the separator 70 to effect a satisfactory separation from the liquid. This velocity will ordinarily be in excess of a calculated value of 100 feet per second. The upper limit of the velocity will usually be determined by the fact that too great a mass velocity (or momentum) in the separator will cause turbulence and hence entrainment of the liquid particles. In the case of tall oil distillation, this will be indicated by a darkened distillate. The tall oil as we have found it has a boiling range of from 400 degrees F. to 600 degrees F. at below 25 mm. of mercury pressure absolute. In the distillation we have successfully used an average temperature in the heating jackets 67, 67' of from 650 degrees F. down to 550 degrees F. while maintaining an absolute pressure on the system of from 25 mm. to 2.5 mm., preference being had for the lower absolute pressure.

If desired, a plurality of tube stills may be operated in tandem, i. e. by having the pitch component of one still led directly to a second still, and if desired such stills may be equipped with a condenser common to all.

The product thus obtained by distillation of the crude anhydrous tall oil, followed by separation of the rosin by crystallization and redistillation of the noncrystalline component is an amber colored oil having the viscosity of medium motor oil. It has a characteristically mild woody odor which nearly disappears when the product is made into soap. The following is a typical analysis of the product:

| | Percent |
|---|---|
| Rosin acids calculated to abietic acid | 25 to 35 |
| Fatty acids calculated to oleic acid | 55 to 45 |
| Sterols and higher alcohols | 20 to 15 |

Among the fatty acids present are oleic, linoleic and linolinic acid. The purified tall oil is free of mineral acids and of esters.

The rosin produced from the crystallizing step is a yellowish oily crystalline powder resembling pale maple sugar. The crystals have a melting point above 100 degrees C. and by recrystallization are then, if desired, brought up to the melting point of pure abietic acid, about 170 degrees C. As produced, it contains in excess of 90% abietic acid and has an acid number of about 180 mg. KOH per gram.

The improved oily product referred to as purified tall oil is without sediment (A. S. T. M. benzol extraction) and without moisture. It is substantially without ash content upon ignition. It has a saponification value of 150 to 165 and an iodine value (Hanus) of from 100 to 160.

Various changes both in the method and in the apparatus may be made as will occur to those skilled in the art without departing from the spirit of our invention. While we prefer to redistill the oil separated from the crystallization step, for many purposes this will not be necessary.

We claim:

1. The process of purifying crude tall oil as obtained from spent wood treating liquor to obtain therefrom pitch, abietic acid and a distillate rich in fatty acids, which comprises subjecting the crude substantially anhydrous tall oil obtained from said liquor to a continuous flash evaporation under high vacuum in the absence of steam or other added carrier gas or vapor to separate said tall oil into a vapor rich in abietic and fatty acids and a liquid residue rich in pitch, separating said vapor from said residue and condensing said vapor, the distillate so obtained being substantially free from tar or other substances inhibiting crystallization of the abietic acid, cooling said distillate and permitting said abietic acid to crystallize, and separating such crystals from the distillate, thereby leaving a distillate rich in fatty acids.

2. The process according to claim 1 comprising the additional steps of redistilling the distillate rich in fatty acids and returning the residue therefrom to the anhydrous tall oil about to undergo the first distillation.

3. The process according to claim 1 including the step of first rendering the crude tall oil anhydrous by subjecting it to heating to above 100° C. under pressure and flashing off the moisture by reducing the pressure while retaining the crude tall oil as liquid.

4. The process according to claim 1 which includes the steps of concentrating said liquor until the soaps become insoluble, causing said soaps to precipitate out from said liquor, and recovering said soaps, washing said soaps to remove lignin and other impurities, acidifying said washed soaps to obtain therefrom a crude tall oil, thereby forming a brine by the interaction of the acidifying agent and the cation of said soaps and utilizing the brine so obtained as the washing medium for the crude soaps in said washing step.

5. The process according to claim 1, which includes the steps of concentrating said liquor until the soaps become insoluble, causing said soaps to precipitate out from said liquor, and recovering said soaps, washing said soaps to remove lignin and other impurities, acidifying said washed soaps and precipitating therefrom a crude tall oil under a hydrogen ion concentration of approximately 4.8 to 5.5.

6. The process according to claim 1, which includes the steps of concentrating said liquor until the soaps become insoluble, causing said soaps to precipitate out from said liquor, and recovering said soaps, washing said soaps to remove lignin and other impurities, acidifying said washed soaps to obtain therefrom a crude tall oil while maintaining a pH of approximately 4.8 to 5.5 thereby forming a brine by the interaction of the acidifying agent and the cation of said soaps and utilizing the brine so obtained as the washing medium for the crude soaps in said washing step.

EDWARD M. FRANKEL.
ARTHUR POLLAK.